United States Patent [19]

Kitzmiller

[11] Patent Number: 4,953,280

[45] Date of Patent: Sep. 4, 1990

[54] METHOD OF MANUFACTURING PRESTRESSED CONCRETE CULVERTS

[75] Inventor: James K. Kitzmiller, Dallas, Tex.

[73] Assignee: Gifford-Hill & Company, Inc., Dallas, Tex.

[21] Appl. No.: 464,588

[22] Filed: Jan. 11, 1990

Related U.S. Application Data

[63] Continuation of Ser. No. 57,772, Jun. 3, 1987, abandoned.

[51] Int. Cl.[5] .......................... B23P 17/00; B28B 7/02; B28B 7/24; B28B 11/14

[52] U.S. Cl. .......................................... 29/412; 29/452; 249/11; 249/119; 249/155; 264/157; 264/228; 264/229; 264/261; 264/297.9; 404/2; 405/124

[58] Field of Search ..................................... 264/31-35, 264/228, 229, 256, 261, 297.9, 157, 219, 138; 404/2, 3, 6-8; 249/11, 27, 119, 122, 155; 425/111; 405/124-126; 29/412, 452

[56] References Cited

U.S. PATENT DOCUMENTS

| | | | |
|---|---|---|---|
| 494,576 | 4/1893 | Lewis . | |
| 903,909 | 11/1908 | Steiner | 264/228 |
| 1,334,871 | 3/1920 | Luten | 264/32 |
| 1,997,236 | 4/1935 | Schroeder, Jr. . | |
| 2,041,267 | 5/1936 | Schroeder, Jr. . | |
| 2,234,663 | 3/1941 | Anderegg | 425/111 X |
| 2,265,871 | 12/1941 | Scott . | |
| 2,306,548 | 12/1942 | Leemhuis | 249/122 |
| 2,786,255 | 3/1957 | Heeb | 249/11 |
| 3,233,027 | 2/1966 | Wennström | 264/228 |
| 3,693,927 | 9/1972 | Jennings | 249/11 |
| 3,696,177 | 10/1972 | Holland | 264/33 X |
| 4,023,764 | 5/1977 | Clements | 249/27 |
| 4,093,173 | 6/1978 | Kawamata et al. | 249/27 X |
| 4,117,071 | 9/1978 | Hannah | 264/256 |
| 4,123,485 | 10/1978 | Tang | 264/228 X |
| 4,142,705 | 3/1979 | Mitter | 249/11 X |
| 4,201,711 | 5/1980 | Thomsen et al. | 264/228 X |
| 4,255,104 | 3/1981 | Stinton | 264/228 X |
| 4,537,529 | 8/1985 | FitzSimons | 405/125 |
| 4,558,969 | 12/1985 | FitzSimons | 405/124 |
| 4,564,313 | 1/1986 | Niswander et al. | 405/125 |
| 4,595,314 | 6/1986 | Lockwood | 405/125 |
| 4,679,762 | 7/1987 | Lee | 264/33 X |

FOREIGN PATENT DOCUMENTS

| | | | |
|---|---|---|---|
| 561135 | 5/1944 | United Kingdom | 425/111 |

OTHER PUBLICATIONS

Humes "Large Box Culverts . . . ".
Humes "Box Culverts", pp. 1-15.

*Primary Examiner*—Jan H. Silbaugh
*Assistant Examiner*—Karen D. Kutach
*Attorney, Agent, or Firm*—Johnson & Gibbs

[57] ABSTRACT

A method of manufacturing a three-sided culvert includes prestressing tendons in the culvert form. A series of prestressing tendons are secured within a form adapted for casting a concrete culvert having three orthogonal sides. The prestressing tendons are utilized in the top slab of the three-sided culvert and are positioned within the form prior to the pouring of concrete therein. Reinforcing steel can be eliminated along with the costs associated therewith and a culvert configuration can be provided with enhanced strength and improved material properties. Such culverts may thus be provided in modular form for placement upon foundations at remote locations for the creation of bridges, drainage areas and the like.

15 Claims, 2 Drawing Sheets

METHOD OF MANUFACTURING PRESTRESSED CONCRETE CULVERTS

This is a continuation of application Ser. No. 57,772, filed June 3, 1987, now abandoned.

BACKGROUND OF THE INVENTION

1. Field of the Invention

The present invention relates to modular concrete culverts and, more particularly, the manufacture of a three-sided concrete culvert with prestressing tendons running therethrough.

2. History of the Prior Art

The prior art is replete with culvert designs affording a passage way for water or traffic beneath embankments, roadways and the like. The technology of culvert construction extends back into technological antiquity. Culverts were originally constructed for free water flow and built from available stones and rock indigenous to the area of construction. The last century has obviously seen marked advances in culvert construction and design. In contemporary culvert construction there are two major approaches, to wit: construction in place and installation of prefabricated sections. There are, of course, hybrid assemblies and many of these approaches have been found patentable by the U.S. Patent and Trademark Office as described in various references set forth below.

Culvert construction like any other advanced construction technique requires a solid foundation. Such foundations come in many forms including slabs, piers, footers and/or beams. The type of foundation obviously depends on the area of use of the culvert, the necessary flow area therethrough and the loading characteristics therefor. Small drainage culverts are, for example, generally formed of metal or concrete pipes sometimes placed directly on earthen beds, preferably with a gravel or granular base. Larger culvert installations for accommodating massive amounts of water flow generally utilize a concrete or steel culvert body of either a precast modular or cast in place construction that is disposed upon a wide slab, multiple piers or beams. Both slabs and beams have been used for decades with steel and concrete culverts of both precast and cast in place varieties. Moreover, the interconnection between the culvert body and the foundation or base has itself been the subject of numerous developmental activities including several prior art patents. For example, U.S. Pat. No. 494,576 to Lewis shows an arcuate culvert body of the prefabricated variety disposed upon a base comprised of two beams and/or footers in support thereof. This very old reference clearly teaches the utility of resting a metallic culvert body on such a foundation constructed along a stream. The arcuate construction was once a very popular design due to the fact that the loads which could be supported were evenly distributed around the arcuate culvert in accordance with basic principles of structural engineering. Such an arcuate design did, however, require side support of the culvert section by both the earthen fill regions laterally thereof and the culvert foundation. In many instances, the culvert foundation or footers included grooves in which the sidewalls of the culvert were inserted as shown in the Lewis patent. This type of culvert construction was common for many decades until the advent of more advanced structural technology.

When the structural limitations and advantages of concrete were more fully known and the portability of concrete via portable mixing units and the like was established, much larger and stronger culvert sections could be provided. Again, two types of concrete culverts found commercial success, to wit: the box culvert and the three-sided culvert. The box culvert, as the name defines, is comprised of four generally orthogonal concrete walls defining an internal passage therethrough. Box culverts could easily be poured at the site of the culvert construction by first pouring a slab foundation and side and top walls thereover. Technological advances provided such concrete structures and more lightweight configurations which could then be cast in modular form at locations remote from the ultimate site of installation. These modular box culverts then became a very popular article of commerce in conjunction with the more conventional pipe culvert section which also found widespread popularity. The box culvert, however, provided one feature which a circular pipe culvert did not, that was a substantially uniform cross-sectional area with vertical rise in water level. Further advances resulted in the utilization of the three-sided culvert module which could be manufactured and transported to the installation site. The culvert foundation, either of the slab or beam variety was necessary and had to be formed, reinforced and poured separately from the upper culvert body portion anyway. Since time at the installation site is obviously more expensive than time in a manufacturing facility, the three-sided modular culvert comprising a top slab and two generally parallel vertical wall portions became very popular. One such culvert is set forth and shown in the Humes Manufacturing Catalog. No. CPR14-70R dated 1970. Such three-sided culverts having parallel side walls and a planar top surface, found widespread popularity and have been installed for years on a variety of culvert foundations for a number of culvert installations and applications.

There have also been several designs deemed patentable by the U.S. Patent and Trademark Office in view of the prior art references that were then before the Office in the area of three-sided culverts. For example, U.S. Pat. No. 4,564,313 was issued to Nisswander in 1986 for a three-sided, rectilinear bridge or culvert structure comprising a pair of vertical sidewalls set in preform or cast-in-place footers. Although that patent does not refer to or discuss the three-sided culvert installation such as that shown in the Humes catalog referred to above, it does address various concrete and corrugated metal covered culverts, bridges and arch bridges existing in the prior art. As stated therein, reinforcing bar, or "rebar", was commonly used in the concrete and numerous prior art references are cited.

One aspect of a rectilinear, three-sided culvert is the haunch, preferably disposed in each internal corner to assist distribution of load. Haunches too are well known in the prior art as taught in the Humes catalog. Likewise, the Lockwood U.S. Pat. No. 4,595,314 also issued in 1986 for a culvert section including vertical parallel spaced concrete sidewalls integrally connected by an arcuate concrete top wall having a curved inner surface. Again, the structural aspect of the culvert in the modular configuration is shown to include the primary utilization of rebar. The FitzSimmons U.S. Pat. No. 4,527,529 issued in 1985 also shows an arch shaped, precast, reinforced concrete element again using a reinforced steel concrete body. The FitzSimmons U.S. Pat.

No. 4,558,969 is a 1985 patent teaching a hinge for use with large, precast, overfill load supporting structures. The precast load support structure is again taught to be constructed with reinforced steel and in an arcuate configuration for transferring various lateral and vertical loading. Specific examples are, in fact, given in this and other references relative to the size of reinforcing bars as well as the center-to-center spacing thereof. These are examples of the state of the prior art relative to precast, modular, culvert configurations. It may be noted that the utilization of rebar though effective has certain limitations and structural implications. However, the use of rebar is not limited simply to precast modular elements.

The more conventional prior art of culvert design is also replete with bridge and culvert forms which allow the formation of a concrete culvert structure at the installation site. For example, the Jennings U.S. Pat. No. 3,693,927 is a 1972 reference showing a release plate for a collapsible culvert form. This particular construction box culvert is formed by first pouring a concrete base having footings integrally constructed on the floor or ground surface on which a roller unit form may be supported. Consistent with this invention, concrete can be poured in the movable forms once the base has been set and this particular reference illustrates again the utilization of the footer design having a groove formed therein for this cast-in-place configuration. Such cast culverts and the utilization of forms does, however, date back many decades prior to the Jennings patent. For example, the Schroeder, Jr. U.S. Pat. No. 2,041,267 teaches the utilization of a series of forms for a culvert assemblage.

Another prior art patent of earlier design in the culvert form area is set forth and shown in the Scott U.S. Pat. No. 2,265,871 showing a bridge and culvert form. The forms are shown to be collapsible and removable for framing relative to pouring at the installation site.

Such culvert designs have thus addressed specific configurations of cast, precast, metal, boxed, U-shaped and arcuate configurations. In all of the concrete structures set forth and shown in the prior art, the utilization of rebar is the primary means of structural support. It is known in the prior art, however, to use prestress and post-tensioning tendons in concrete structures. Such prestressing and tensioning tendon technology is well established, particularly in the construction industry. The tendons are disposed within the forms either in a taut configuration where the cables themselves are exposed to the concrete poured therearound for bonding thereto or the tendons are sheathed for protection from the concrete so that post-tensioning can occur. There are numerous structural and functional differences, but there is one similarity. Most conventional prestressing and post-tensioning technology pertains either to cast-in-place beam and slab concrete structures or concrete pipe production techniques. The utilization of prestressed or post-tensioned tendons in the fabrication of modular culverts has not been addressed. For example, the Kinney U.S. Pat. No. 3,005,469 teaches prestressing concrete pipe with prestressing tendons which are wrapped around the outside of a pipe, tensioned the desired amount and secured in place for the purpose of maintaining the pipe in compression. The Prosser U.S. Pat. No. 2,164,625 teaches a concrete pipe and method of producing same again for providing a relatively thin wall but very strong assemblage. The general object of such structures is to provide a concrete element and method of production by which the strength of the reinforcement therein may be utilized to prevent rupture during use in a manner that conventional rebar reinforcement is not satisfactory. Moreover, such fabrication techniques can be provided in a cost-saving and weight saving configuration. The Miller - Osweiler U.S. Pat. No. 2,236,107 likewise teaches a reinforced pipe and method of making same which is a 1941 reference utilizing such tensioning techniques.

It would be an advantage therefore, to overcome the problems of the prior art modular culvert assemblies by providing a method and apparatus for constructing modular concrete culverts in lightweight configuration capable of withstanding greater loads and for less cost. Such a structure is provided by the present invention which teaches the utilization of a three-sided culvert, the top of which is fabricated with prestressed tendons disposed therethrough. The tendons enable the structure to be constructed for withstanding loads much greater than that ordinarily affordable with conventional rebar reinforced slabs and at a weight substantially less than the weight of a modular structure adapted for equivalent loading characteristics. This reduces the cost of manufacture, transportation costs and installation expenditures. One foundation for the culvert is also provided in a configuration which maximizes flow area while reducing costs. Moreover, with the present invention a plurality of modular culvert sections can be fabricated simultaneously utilizing the innovative teachings and techniques of the present invention as further described below.

SUMMARY OF THE INVENTION

The present invention relates to an improved three-sided, modular culvert of the type having vertical walls connected by a top slab portion disposed therebetween. The culvert is adapted for placement in earthen areas for facilitating the flow of water therethrough The improvement comprises a plurality of prestressed, tendons disposed within the top slab and terminating on opposite sides thereof for affording structural reinforcement thereto. The sidewalls are reinforced with structural steel with portions of the structural steel extending into the top slab. The sidewalls and the slab intersect in a generally orthogonal relationship.

In another aspect, the modular culvert of the present invention includes prestressed tendons in the top slab constructed of multistrand steel. The tendons are disposed in generally parallel spaced relationship one from the other in a single notional plane disposed within the top slab. The notional plane lies in generally parallel spaced relationship to the notional plane defined by the topmost surface of the slab. The base section for support of the three-sided, concrete culvert thereupon comprises a concrete slab having a width sufficient for extending beneath the culvert in support of the legs thereof. The supporting slab is reinforced with structural steel and the intermediate portion between the legs being recessed to increase the overall flow area beneath and through the modular culvert.

In yet another aspect, the invention includes an improved method of manufacturing a modular concrete culvert having first and second sidewalls and at least one slab section formed therebetween. The improvement comprises the steps of providing a modular casting form having first and second sidewall sections and at least one slab section extending therebetween. Reinforcing steel is secured within the first and second sidewall form sections. Stressing tendons are then positioned within the slab section form, with the tendons extending generally orthogonal to the sidewall forms. The tendons are then stressed while within the slab form by exerting a force from outside the slab form, prior to filling the slab form with concrete and engulfing the prestressed tendons therein. The first and second sidewall forms are filled with concrete to engulf the reinforcing steel therewithin, and by allowing the concrete to cure within the forms a modular culvert section having a prestressed interconnecting concrete slab section between the sidewalls is provided.

In a further embodiment, the invention includes the step of disposing the first and second sidewall forms in generally parallel spaced relationship. An angulated region is formed in the area of intersection between the first and second sidewall forms and the slab form for the creation of a reinforcing haunch region therein. The step of disposing the prestressed tendons in the slab section form in generally parallel spaced relationship along a single notional plane therein is then critical. The notional plane of the prestressing tendons within the slab form is disposed in generally parallel spaced relationship with one surface of the slab for affording an equidistant relationship between the notional planes of the tendons and the surface. The prestressed tendons are each comprised of multistrand cables and the step of prestressing the cables includes providing a plurality of holes within the sidewalls of the slab form and securing the cables outwardly thereof in the stressed relationship.

In yet a further aspect, the invention includes the steps of casting a plurality of modular culvert sections simultaneously. The modular culvert sections are defined by casting forms disposed in side-to-side relationship wherein the prestressing tendons of each extend from one to the other in an interconnecting array for facilitating the expedited fabrication of multiple modular culvert sections. The tendons are then individually tensioned while extending through the modular culvert slab forms until all are stressed. In this way the tension in each slab section is equal to the tension in an adjacent slab section. The slab sections of adjacent forms are then poured with the common tendons extending therethrough prior to the pouring of the first and second sidewall portions thereof The sidewalls are poured after the slab has stiffened but while it still exhibits a wet edge to afford proper bonding.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
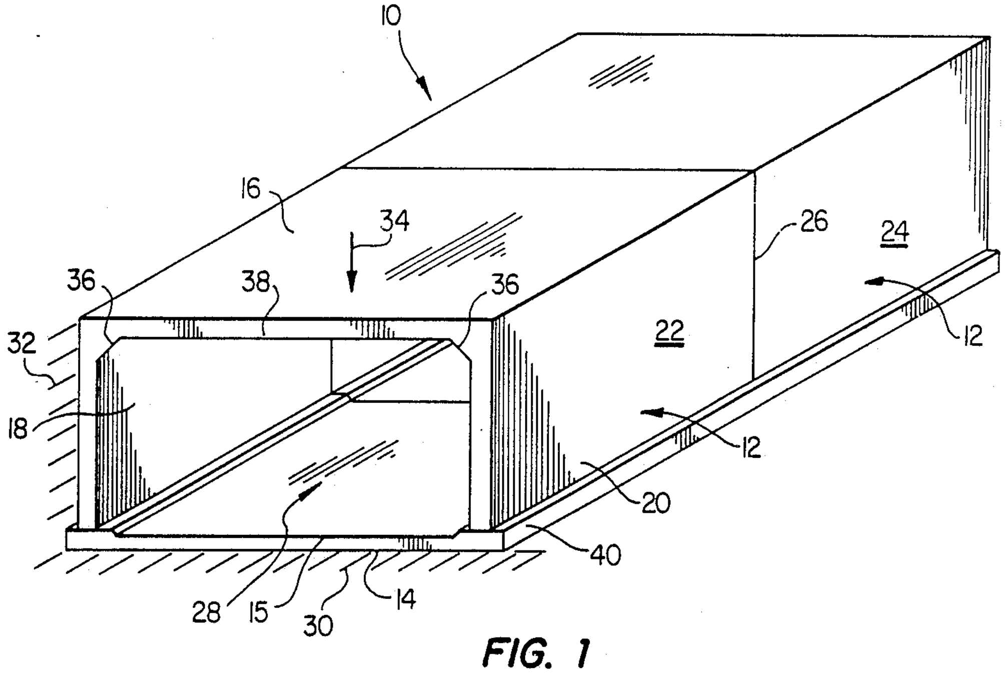
FIG. 1 is a perspective view of a modular, concrete culvert assembly constructed in accordance with the principles of the present invention.

Referring first to FIG. 1, there is shown a perspective view of a modular concrete culvert assembly constructed in accordance with the principles of the present invention. The culvert assembly 10 comprises a plurality of three-sided culvert modules 12 assembled end-to-end upon a base 14. Each culvert module 12 comprises a top 16 and opposite sidewalls 18 and 20 as shown in FIG. 1. The culvert modules 12 are joined one to the other with front culvert 22 abutting rear culvert 24 atop base 14 and in aligned relationship. A line of intersection 26 is formed therebetween. In this aligned assembly, a central flow area 28 is formed for allowing the passage of water or the like therethrough.

It should be noted that the appearance of the concrete culvert shown in FIG. 1 resembles concrete culvert assemblies dating back many decades. Concrete culverts whether constructed of planar side and top walls or of arcuate configurations have been used for many, many years and disposed upon a variety of foundations including beams, slabs, footers and/or piers for use in allowing the passage of water or traffic therethrough. The present invention pertains to a three-sided modular culvert and method of manufacturing utilizing prestressing or post tensioning tendons in the construction of the top slab thereof, which construction facilitates efficiency in fabrication as well as reducing the cost. Structural integrity is, however, not lost while weight is reduced. This has a direct advantageous bearing on the utility of the modular construction of the present invention.

Referring still to FIG. 1, the three-sided modules 12 are preferably constructed at a plant remote from the ultimate site of installation and use. The construction of the modules 12 from concrete thus requires the utilization of reinforcing members including conventional rebar and the like. In the present invention, the construction incorporates prestressing or post-tensioning tendons disposed in the upper slab 16. This allows for a construction of a module 12 which is both stronger and lighter in weight, facilitating transportation and positioning at the installation situs. During installation, the module 12 is disposed upon the appropriate foundation 14 in earthen bed 30 over which water or traffic will pass. Generally, an earthen area 32 is constructed along the sides of the culvert assembly 10 as well as above the top 16. A roadway is sometimes constructed thereacross. The layer of earth as well as the roadway thus imparts a loading atop the culvert in the direction of arrow 34. This loading must be structurally supported by the culvert top 16 and sidewalls 18 and 20. Otherwise failure would occur.

Methods of reinforcing structural concrete is, of course, the subject of numerous prior art approaches. These are manifest in the prior art patents cited above. Such patents illustrate the utilization of beams and slabs either separate or part of the base of three-sided and four-sided culverts, which are either modular or built in place. In the present invention, such support is provided by a slab foundation which underlies the three-sided culvert in its modular form. The sidewall beams 40 of the foundation base 14 are thus constructed in a suitably deep configuration for the requisite support thereof. This configuration can be either more or less than the thickness of the intermediate body section of the base 14. In the present invention, and as described in more detail below, the sidewall beams 40 are flat and an intermediate section 15 is provided with reduced thickness for increasing the flow area beneath and through the modular culvert 10. This is done without increasing the cost of construction and, more particularly, by reducing the necessary height of the sidewalls 18 and 20. It should be noted that keyways (not shown) are sometimes formed in the beams 40 to secure the sidewalls, but are not used in this embodiment. The aspect of setting the sidewalls 18 and 20 within a recess formed in the sidewall beam 40 is quite common in the prior art but not always required. The present invention pertains not to such foundations, but to the culvert and method of fabrication of the lightweight yet structurally sound three-sided modular structure by the utilization of prestressing or post tensioning tendons in the top slab thereof.

Figure 2:
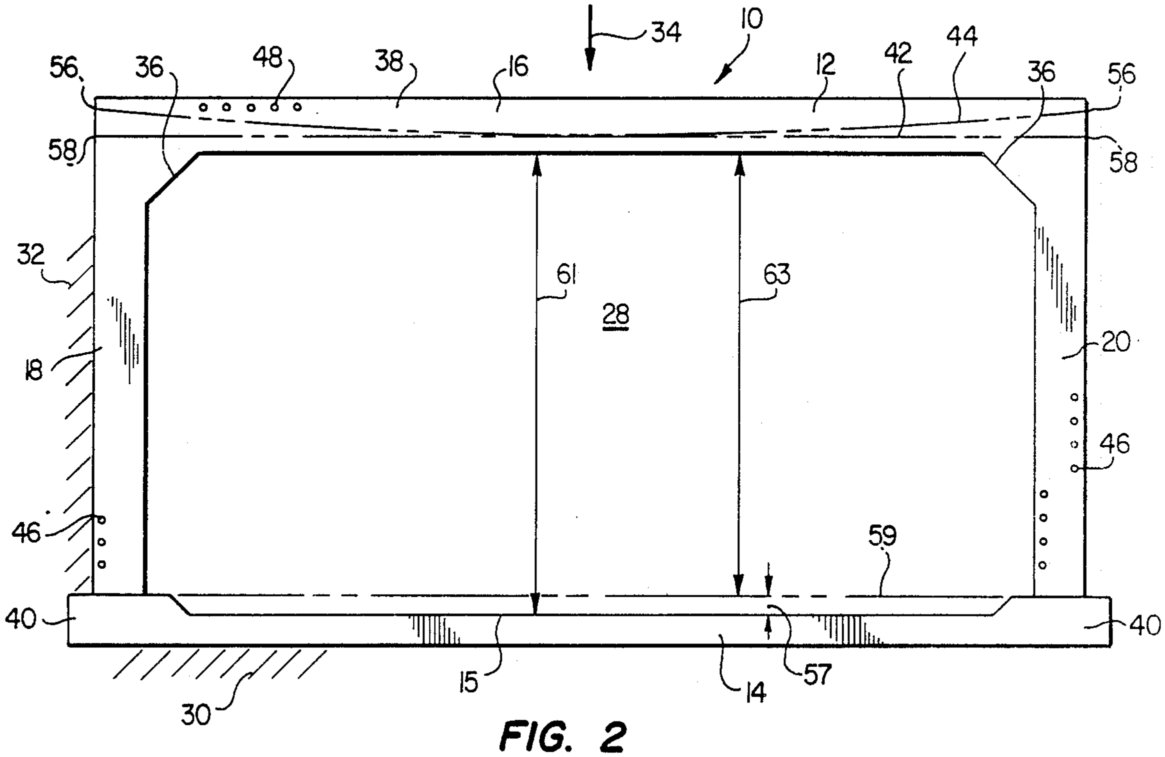
FIG. 2 is an enlarged, front-elevational view of the concrete culvert assembly of FIG. 1 illustrating the method of manufacture thereof.

Referring now to FIG. 2, there is shown an enlarged front-elevational, cross-sectional view of the module 12 with tensioning tendons positioned therein. A straight tendon 42 is thus shown positioned in the top slab 16 for structural support therein. The tendon 42 is of the prestressing variety having an unsheathed outer surface and preferably formed of spiral steel cable or the like. The unsheathed cable is disposed in a taut mode within the top slab 16 while concrete is poured thereover forming a solid bond therearound. This bond affords structural support in the slab 16. As described below, the side walls 18 and 20 are poured after the slab 16 and while the slab is sufficiently "stiff" and exhibits a "wet edge" for proper bonding. These manufacturing considerations afford vast cost savings while maximizing structural integrity of the unit.

It should be specifically noted that it is likewise within the spirit and scope of the present invention to provide a tensioning cable in a "draped" configuration such as that shown by the phantom line 44 herein. The "draped" configuration can be provided for enhancing the structural integrity of the top slab 16 in much higher loading configurations than that possible with a straight tensioning configuration. This can be done without expanding the thickness of the top slab and indeed with less structural steel, weight and the expense that would ordinarily be deemed necessary. Such construction, utilizing concrete tensioning tendons and modular configurations, will afford great cost savings in both fabrication and installation of the modules 12 because the cost of rebar steel concrete and the placement thereof in forms is expensive and adds weight to the overall assemblage. It cannot provide the enhanced loading characteristics that prestressed concrete manifests without increasing the thickness of the top slab 16. Rebar or steel mesh reinforcement 46 is, of course, still used for certain structural reinforcement of the concrete and is shown in the sidewalls 18 and 20. Rebar or steel mesh 48 are likewise shown in the top slab 16 as is necessary for proper structural integrity even in utilization of prestressing tendons 42 or 44. The vertical loading force 34 as well as the sidewall earth region 32 is likewise set forth and shown herein for purposes of illustration.

Still referring to FIG. 2, there is shown in more detail the construction of the base slab 14 and the more shallow intermediate section 15. This region of the base slab 14 is recessed a distance 57 from the notional plane 59 formed by the top of the side beams 40. The region of space 57 beneath the notional plane 59 may be seen to reduce the amount of concrete necessary for pouring the slab 14 which is multiplied for each modular section incorporated into a particular culvert assembly. Moreover, this particular configuration affords an increase in the overall flow height of the central flow area 28. The height dimension represented by arrow 61 may be seen to be appreciably longer than a height 63 taken above the notional plane 59. This increase in flow area 28 is one parameter that is determinative of the length of the span of top slab 16. The dimensions of the modular culvert section 10 are dependent to a great extent on the necessary flow area 28. By increasing the flow area through the central recess area 15 of the slab 14, cost savings can be effected at the point where maximum expense is otherwise incurred in the culvert manufacture. As defined herein, the maximum area of cost of the fabrication of the culvert section 10 is in the side walls and the top slab 16. By reducing the span, less concrete and less cost is associated with production. Loading factors are also improved due to the fact that the reduced length of span has greater support for the load 34 disposed thereabove.

Addressing now the top slab 16 shown in FIG. 2, each structural tendon 44 or 42 terminates outwardly of said slab at points 56 and 58, respectively. When utilizing prestressed cables 42 and 44, the cable is exposed and bonds directly to the concrete in the slab 16. When using post-tensioning cables, anchor plate assemblies (not shown) would be necessary at the termination points 56 and 58. Although anchor plate assemblies are not shown, they are conventional in the prior art in the utilization of post-tensioned concrete structures. It should be noted that the present invention pertains to any tensioning tendon either of the prestress or post-stressing variety secured within the concrete structure. It is obviously a distinct advantage to utilize prestress tendons which can be utilized for the fabrication of multiple modules 12 at one time without the need for anchor plates. This fabrication technique will be described in more detail below.

Figure 3:
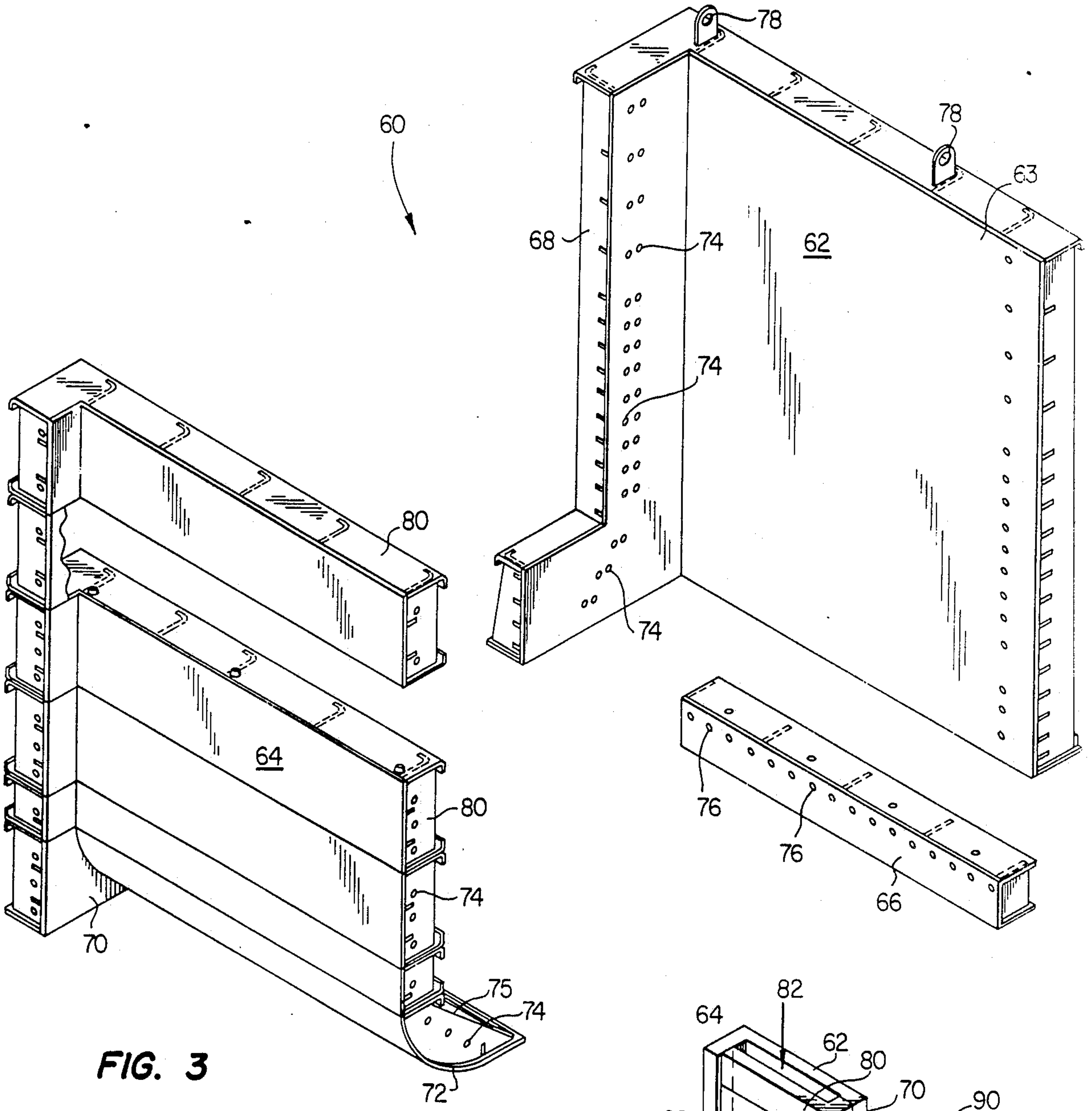
FIG. 3 is an enlarged, exploded perspective view of one method of constructing the concrete culvert assembly of the present invention.

Referring now to FIG. 3, there is shown an enlarged, perspective, exploded, fragmentary view of one embodiment of a form used in the construction of a modular culvert 12 in accordance with the principles of the present invention. The form 60 as shown herein illustrates a series of elements thereof in fragmentary perspective. This limited illustration is for purposes of clarity because various pieces are duplicative of the other and their presence would block the view of other elements. For example a first outside, sidewall form 62 is shown without its mating inside wall form section. An inside sidewall form section 64 is, however, shown without its mating outside wall section. The inside wall form 64 is constructed for matingly engaging in an outside form 62 in an oppositely disposed relationship. In essence, only half of the elements of each form 60 are shown because the missing elements are simply duplicative of the elements which are shown herein. A header 66 is thus illustrated for use in conjunction with the form 62 and positioning therebeneath as will be shown in more detail below. Each of the forms 62, 64 and 66 are constructed in a conventional manner from wood or the like having apertures formed therein for receiving the appropriate fasteners, reinforcing steel, or tensioning tendons as hereinafter described. Form 62 for example has an outside wall 68 formed generally orthogonal to the central body 63 and includes a plurality of apertures 74 formed therein for securement of inside form 64. Inside form 64 has an outside wall 70 for securement against central body 63 of outside form 62 wherein a series of apertures are likewise formed therein to facilitate securement. The form 64 has a curved base region 72 which is fabricated for forming a curved haunch section as compared to the straight haunch section 36 shown in FIGS. 1 and 2. It should be noted that either straight or curved haunches are conventional in the prior art and a curve configuration is shown herein for purposes of illustration. Even with curved haunch sections 72 a substantially planar slanted region 75 is presented from a constructional standpoint as illustrated both in FIGS. 3 and 4. This flat region should not be confused with resembling the planar haunch 36 in FIGS. 1 and 2 in that the surface 75 is the outer surface of the form 64 and not the surface against which the concrete is formed.

Still referring to FIG. 3, the forms 60 are constructed for multiple uses in a high efficiency fabrication line. For this reason they are constructed in the double wall configuration shown with ample securement devices therein and means for securing one piece to the other. The forms are particularly adapted for the specific application of the present invention wherein the header form 66 includes a plurality of apertures 76 adapted for receiving the tensioning tendons therethrough prior to the pouring of concrete. The form sidewall 62 also includes a pair of hangers 78 adapted for receiving a hoisting chain for positioning upon a casting table and removal of the form from the cast section. The forms are likewise constructed in segments for purposes of facilitating assembly, disassembly and various modifications in length, width and size in each particular culvert. Sections 80 are, for example, illustrated in the inside form sections 64 as would be conventional with such casting techniques. The sections 80 are adapted for securement one to the other having lateral flanges formed therebetween as shown in FIG. 3. It is conventional to secure such modular sections 80 one to the other by threaded fasteners or the like. Likewise the utilization of apertures 74 formed in the side walls and ends thereof for securement of the assembled modular sections such as in the inside form 64 to an outside form 62 is conventional in the prior art. It should be recognized, however, that the illustration of apertures 74 should not be confused with the illustration of apertures 76 in header 66. The apertures 76 are provided in an aligned configuration of a "notional tensioning plane" adapted for receiving the tensioning tendons therethrough and the configurations as described in more detail below.

Figure 4:
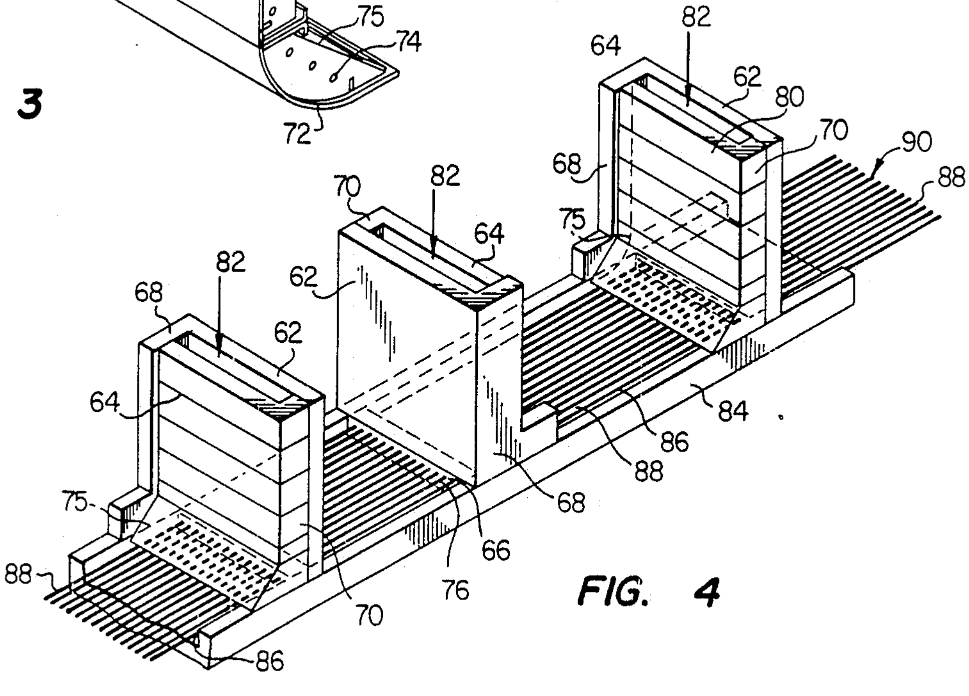
FIG. 4 is a perspective view of casting the modular, concrete culverts of FIG. 1 in accordance with the principles of the present invention.

Referring now to FIG. 4, one embodiment of a method of construction of the apparatus of the present invention is shown. Forms 60 are thus illustrated disposed upon a casting table 84 for casting the modular culverts 10 in an upside-down position. The casting table 84 is constructed with sidewalls upon which rests the forms 60 forming a pour cavity 86 therebeneath. Within the cavity 86, which defines top slab 16, a plurality of prestressing tendons 88 are secured. The tendons 88 are presented in a prestressing array 90 adapted for receiving a pour of concrete thereover. The concrete poured over the tendon array 90 will obviously occur prior to the pour of the concrete within the formed sidewall chamber 82 defined by each form 60 disposed atop the casting table 84. The sidewall chamber 82 is defined by the securement of the outside wall 62 to inside wall 64 in each form 60. For purposes of illustration, the sidewalls 68 and 70 of each are labeled for purposes of identification and to further illustrate the manner of construction and method of fabrication in accordance with the principles of the present invention.

Still referring to FIG. 4, each tendon 88 is received through an aperture 76 and the header 66 as most clearly set forth in FIG. 3 above. However, the tendon array 90 is most clearly seen in FIG. 4 to comprise a notional plane that is capable of being specifically and selectively established upon the casting table 84 with great control of tolerances. The tendon array 90 can, in fact, be provided in the drape configuration shown in FIG. 2 because the individual tendons 88 are totally exposed and open to adjustment prior to the pour. The tendons 88 can thus be draped by utilizing conventional support devices (not shown) upon the casting table 84. The magnitude of tension can likewise be controlled on individual tendons 88 within the array 90, and each tendon 88 is preferably individually tensioned while extending through the slab forms.

Of major significance in the present invention is the utilization of a tendon array 90 disposed through a plurality of molds 60. The molds are positioned in side-to-side relationship upon the casting table 84. As shown in FIG. 4, the number of individual three-sided culvert sections which can be poured and manufactured at one time is limited only by the length of the casting table 84 in conjunction with certain structural, constructional and logistical parameters. It is known to provide tendons in a sufficiently lengthy configuration for the simultaneous manufacture of a plurality of prestressed, flat slabs upon a casting table. The principles of the present invention however afford a construction technique for large 3-dimensional culverts. The technique requires addressing casting considerations not heretofore recognized. For example, the upstanding side walls 18 and 20 are poured after the slab 16 and must be poured when the slab 16 is sufficiently "stiff" but for example presents a "wet edge". Time frames on the order of 1 to 1.5 hours have been found acceptable, but will vary depending on size and pour conditions. Likewise, the size of each culvert can be easily and inexpensively varied. The addition or deletion of sidewall sections 80 shown in FIG. 3 would obviously alter the height of the mold 60 and of the resulting sidewalls 18 and 20 of the completed modular culvert end. The length of the top slab 16 is easily defined by the spacing between the forms 60 positioned upon the table 84. A much wider slab 16 can thus be accommodated by simply affording variation in spacing between the individual forms 60. Structural considerations can be accommodated by variations in the size of the tendons 88 and/or the prestressing thereof. Likewise the number of tendons can be varied by simply changing the header 66 with the size and/or number of apertures 76 formed therein.

It may thus be seen that unlike conventional fabrication techniques particularly used for culvert sections, the present invention affords a multitude of advantages including a lightweight construction of efficient manufacture and quality control. The prestressing of individual tendons to exact specifications, the designation of the tendon array configuration, the pour times and control thereover are but a few examples. After a pour, the forms 60 as seen in FIG. 4 are removed by the hangers 78. The culvert sections 10 are separated one from the other by cutting the tendons 88 adjacent the sidewalls of the culvert 10 to form the termination points 58 (for straight tendons) or 56 (for draped tendons) as shown in FIG. 2. Because the preferred embodiment of the present invention utilizes prestressed tendons, the utilization of post-tensioning apparatus such as anchor plates and the like is not shown. The modular construction which is shown incorporates an array 90 of prestressing tendons 88 having a length that can be utilized to fabricate a series of modular prestressed concrete sections 12.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. A method for efficiently manufacturing a plurality of three-sided, reinforced modular concrete culverts in an upside-down position, each of said culverts comprising two opposite sidewalls and a top slab formed therebetween, said method comprising the steps of:

providing a casting table having two opposite sidewalls, said sidewalls forming a pour cavity therebetween, said pour cavity providing for the formation of the top slabs of said plurality of inserted modular concrete culverts;

providing at least two adjacent pairs of sidewall forms, each sidewall form having a first sidewall form part and a second sidewall form part opposite to said first sidewall form part, said first and second sidewall form parts when in engagement with each other forming a chamber therebetween within which reinforcing steel is placed, each pair of sidewall forms in cooperation with said pour cavity of said casting table providing for the formation of each of said modular concrete culverts including said opposite sidewalls and said top slab formed therebetween;

positioning at least one prestressing tendon in said pour cavity of said casting table;

securing reinforcing steel within said chamber of each of said sidewall forms;

resting said at least two adjacent pairs of sidewall forms upon and across said casting table sidewalls in a generally parallel, spaced relationship one to the other, said chambers projecting generally perpendicularly upward from said casting table sidewalls, thereby providing for the formation of adjacent concrete culverts;

stressing said at least one tendon by exerting a force from outside said pour cavity;

pouring concrete into said pour cavity of said casting table and over said at least one prestressed tendon;

pouring concrete into said chambers of said at least two adjacent pairs of sidewall forms;

cutting said at least one tendon at an intermediate point between said two adjacent pairs of sidewall forms;

removing said at least two adjacent pairs of sidewall forms; and separating said plurality of inverted modular concrete culverts into individual reinforced modular concrete culverts, said plurality of inverted modular concrete culverts disposed in side-to-side relationship along said casting table, said individual modular concrete culverts each having first and second opposite sidewalls and said top slab formed therebetween.

2. The method as set forth in claim 1 and further including the step of forming an angulated form region in the area of intersection between each pair of said sidewall forms and said casting table for the creation of a haunch region therein.

3. The method as set forth in claim 1 and further including the step of disposing a plurality prestressing tendons in said pour cavity of said casting table in generally parallel spaced relationship along a single plane therein.

4. The method as set forth in claim 3 and further including the step of disposing said plane of said parallel prestressing tendons within said pour cavity in generally parallel spaced relationship with one surface of said casting table for affording an equidistant relationship between said plane of said parallel prestressing tendons and said surface.

5. The method as set forth in claim 3 wherein said prestressing tendons are each comprised of multi-strand cables and said step of stressing said cables includes the step of securing said cables outwardly of said casting table in said stressed relationship.

6. The method as set forth in claim 3 wherein said prestressing tendons extend through said pour cavity of said casting table in an interconnecting array for facilitating the expedited fabrication of said plurality of modular concrete culverts in said side-to-side relationship.

7. The method as set forth in claim 6 and further including the step of tensioning said tendons extending through said pour cavity of said casting table, whereby the tension throughout said pour cavity is the same such that the tension in each formed top slab is also the same.

8. The method as set forth in claim 7 and further including the steps of pouring concrete into said pour cavity of said casting table with said interconnecting array of common tendons extending therethrough prior to the pouring of concrete into said chambers thereof.

9. The method as set forth in claim 3 and further including the steps of filling said pour cavity of said casting table with concrete, allowing said concrete to stiffen, and filling said chambers with concrete while said concrete of said pour cavity presents a wet edge thereto.

10. A method as recited in claim 1, wherein said step of pouring concrete into said pour cavity of said casting table precedes said step of pouring concrete into said chambers of said at least two adjacent pairs of sidewall forms.

11. A method as recited in claim 10, wherein said step of pouring concrete into said pour cavity of said casting table and said step of pouring concrete into said chambers of said at least two adjacent pairs of sidewall forms are separated by a step of waiting until said concrete poured into said pour cavity stiffens to the point of presenting a wet edge.

12. A method as recited in claim 11, wherein said casting table has an inner bottom and further including the step of disposing said at least one tendon in a plane parallel to the inner bottom of said casting table.

13. A method as recited in claim 12, wherein said plane is generally orthogonally disposed in relation to said at least two adjacent pairs of sidewall forms.

14. A method as recited in claim 11, wherein said step of providing at least two adjacent pairs of sidewall forms further includes the step of constructing each of said sidewall forms by providing an inside sidewall form and an outside sidewall form and matingly engaging said inside sidewall form with said outside sidewall form in an oppositely disposed relationship thereby forming said chambers therebetween.

15. A method as recited in claim 14 and further including the step of constructing each of said inside and outside sidewall forms by providing a plurality of sections and assembling said sections together thereby permitting variation in the height of each side of said modular concrete culverts.

* * * * *